United States Patent [19]

Eichinger

[11] 4,384,498
[45] May 24, 1983

[54] SPUR GEAR PLANETARY GEARING WITH LOAD BALANCE

[75] Inventor: Johann Eichinger, Vaterstetten, Fed. Rep. of Germany

[73] Assignee: Carl Hurth Maschinen- und Zahnradfabrik GmbH & Co., Munich, Fed. Rep. of Germany

[21] Appl. No.: 281,275

[22] Filed: Jul. 8, 1981

Related U.S. Application Data

[63] Continuation of Ser. No. 65,783, Aug. 13, 1979, abandoned.

[30] Foreign Application Priority Data

Oct. 5, 1978 [DE] Fed. Rep. of Germany ....... 2843459

[51] Int. Cl.³ .................... F16H 57/10; F16H 1/28
[52] U.S. Cl. ........................ 74/785; 74/797; 74/801
[58] Field of Search ................. 74/785, 797, 801, 410

[56] References Cited

U.S. PATENT DOCUMENTS

| 2,444,363 | 6/1948 | Newcomb | 74/801 |
| 2,492,020 | 12/1949 | Thoresen | 74/801 |
| 2,703,021 | 3/1955 | Stoeckicht | 74/410 |
| 2,956,451 | 10/1960 | Bowman | 74/410 |
| 2,989,288 | 6/1961 | Smith | 254/168 |
| 3,011,365 | 12/1961 | Stoeckicht | 74/410 |
| 3,188,888 | 6/1965 | Zink | 74/410 |
| 3,289,488 | 12/1966 | Breuer | 74/410 |
| 3,352,178 | 11/1967 | Lindgren | 74/410 |
| 4,096,769 | 6/1978 | Horikiri | 74/410 |

FOREIGN PATENT DOCUMENTS

| 229784 | 3/1959 | Austria. | |
| 1550730 | 12/1966 | Fed. Rep. of Germany | 74/801 |

Primary Examiner—Kenneth Dorner
Assistant Examiner—D. Wright
Attorney, Agent, or Firm—Flynn, Thiel, Boutell & Tanis

[57] ABSTRACT

A spur gear planetary gearing arrangement capable of a load balance on the teeth of the gears incorporated therein. The sun gear of the planetary gearing arrangement is supported solely on the planetary gears and the planetary gears are, in turn, rotatably supported on a planetary gear carrier. The teeth of the planetary gears are in meshing engagement with an internally toothed ring gear. The ring gear is mounted in a gear box housing. The ring gear is elastically deformable to a specific degree approximately equal with the radial electricity of its tooth system thereon and independent from the housing.

4 Claims, 6 Drawing Figures

SPUR GEAR PLANETARY GEARING WITH LOAD BALANCE

This is a continuation of application Ser. No. 65,783, filed Aug. 13, 1979, and now abandoned.

FIELD OF THE INVENTION

The invention relates to a spur gear planetary gearing with a load balance, preferably of the type of construction in which the sun gear is not supported, but is supported on the planetary gears which are in toothed engagement with it, which planetary gears are in turn rotatably supported in a planetary carrier and also are in engagement with the internally toothed ring or internal gear, which is received in the gear box.

BACKGROUND OF THE INVENTION

In spur gear planetary gearings of the conventional type, an even load distribution on the three or more planetary gears is a condition for satisfactory operating results. Manufacturing errors like true-running deviations and eccentricity of the tooth system and axial dislocations and angular deviations lead otherwise to an uneven load distribution on the individual tooth systems, which causes not only undesired noises, but in particular the lifetime of the gears and their bearings are also noticeably shortened. Many suggestions have already been made for devices, with which these errors can be balanced out and an even load distribution can be achieved.

Thus it is, for example, known to make the internally toothed ring or internal gear in two parts, wherein an internally toothed ring is surrounded concentrically by a ring which is received in the housing and a connection of the two rings occurs in the area of their separating joint through sleeve springs which are placed in coaxial grooves. In order to prevent a friction corrosion which is caused in the joints by micromovements and a quick wear of the sleeve springs, which wear is associated with these movements, here expensive measures must be taken for an oil supply into the joint. According to a different suggestion (German AS No. 1 180 210), the ring or internal gear is supported through a narrow annular surface on a relatively thin hollow-cylindrical housing wall, the free cylinder surface of which is larger than the width of the tooth. These devices bring satisfactory results for the load balance, if—what is actually the usual case—there occurs only one torque transmission in the gear box. As soon, however, as the housing is exposed to bending forces which act from outside, these forces are transmitted onto the ring gear, which again causes interference in the tooth engagement with overloading of individual areas thereon.

It is known from German OS No. 20 57 312 to form the ring or internal gear of two concentric rings which have a radial spacing therebetween, of which the inner one carries the tooth system and the outer one is connected to the housing and which are connected through a rubber ring which is vulcanized into the radial spacing gap. In place of the vulcanized ring spacer, it is possible, according to German AS No. 26 48 151, for an elastic band which is inserted between concentric tooth systems of the two rings to take over the connection. Due to the limited loadability of the rubber, these constructions are limited in their use.

It is also known to connect the ring or internal gear through a lateral, thin-wall pipelike extension fixedly to the housing (German OS No. 1 450 775), wherein said pipelike part permits in a limited degree an elastic deflection of the internal gear. According to German OS No. 21 10 252, it is also possible for the ring or internal gear to be jointedly suspended within the housing through a sleeve which is similar to a toothed coupling. While in the first case the large structural length of the pipelike extension does not permit its use for many cases, the second solution cannot be used everywhere because of the increased manufacturing expense due to each two additional internal and external tooth systems.

Therefore, the basic purpose of the invention is to produce a planetary gearing arrangement with a load balance, which is capable of both balancing manufacture-caused deviations and also keeping bending forces which act from outside onto the housing extensively away from the tooth system. The gearing arrangement does thereby not have any parts which enlarge the dimensions which are pregiven by the tooth system and the support, it is easy and inexpensive to manufacture and does not have any additional wear parts.

The purpose is attained by providing a planetary gearing arrangement, the internally toothed ring or internal gear of which can be elastically deformed in itself, wherein the deformability is approximately equal to the radial elasticity of its tooth system (mean value during the engagement).

With this it is achieved that outside influences have no or only small effects on the tooth system, on the other hand the tooth system remains sufficiently elastic in order to assure an even load distribution on the three or more planetary gears.

The invention also includes the provision of a simple construction for the internally toothed, one-piece-designed internal gear. An inner, toothed ring is connected through an annular web to an outer ring which is mounted in the gear box housing. Both rings are thereby elastically deformable under a load, without thereby substantially deforming the respective other ring, wherein the possible deformation as a whole can be determined by calculation or tests so that it corresponds approximately to the radial elasticity of the tooth system (mean value during the engagement).

The elastic deformability of the outer ring is achieved in a simple manner by an annular recess, which extends over an important part of its length.

The elastic deformability of the internally toothed internal gear in itself or its stiffness is defined, as mentioned, through the radial elasticity of the tooth system. This requirement can be met through calculations according to the finite-element-method or through tests with various designs. Thus it is for example also possible to design the web elastically deformable. Corresponding with the respectively existing loads, the internal gear can be designed as such symmetrically or asymmetrically.

BRIEF DESCRIPTION OF THE DRAWINGS

The invention will be described hereinafter with reference to the examplary embodiments which are illustrated in the figures.

DETAILED DESCRIPTION

Figure 1:
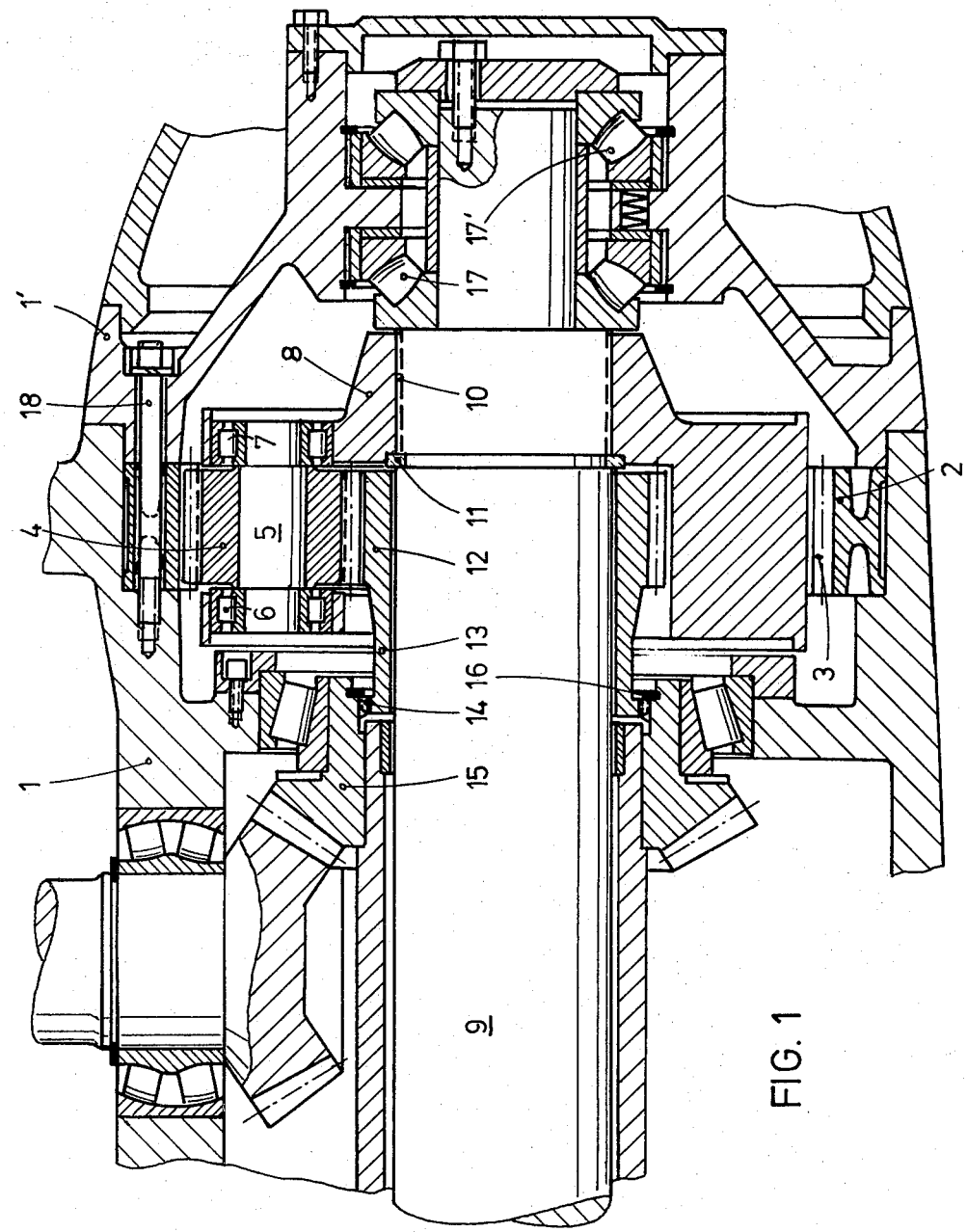
FIG. 1 is a longitudinal cross-sectional view of a cutaway portion of the important parts of a gearing arrangement embodying the invention.

FIG. 1 illustrates a cross-sectional view of the part of a planetary gearing, which is important to the invention and as it is installed into a so-called steerable propeller. (Steerable propellers are used to drive and control ships. The motor torque is thereby transmitted through a vertical shaft and a bevel gear arrangement, after which in the example is connected a planetary gearing, and thence to a horizontal shaft having a propeller secured thereto. Bevel and planetary gearing are housed in one common housing arranged outside of the ship's hull and can be rotated for the purpose of facilitating a control of the ship about a vertical axis. For technological flow reasons, the housing must have outside dimensions which are as small as possible. Suspension of the housing above the line of action of the propeller results in bending stresses in the housing and thus leads to housing deformations. Temperature influences can also contribute to deformations of the housing.)

An internally toothed ring or internal gear 2 is centered and secured by bolts 18 in a gear box 1, 1'. The design of this ring or internal gear will be discussed below. A number of planetary gears mate with the ring or internal tooth system 3 of the internal gear, of which planetary gears one is illustrated and identified by the reference numeral 4. The planetary gears are rotatably supported, however, not axially movably by means of journals 5 and bearings 6, 7 in a planetary carrier 8. The planetary carrier 8 is secured to the driven shaft 9 by means of a toothed coupling system 10 against relative rotation and with suitable means, for example a retaining ring 11, against relative axial movement. The third member of the planetary gearing is an externally toothed sun gear 12, which mates with the planetary gears. The sun gear has an elongated neck 13, which has at its free end a toothed coupling system 14. This toothed coupling system engages an internally toothed system, with which a bevel gear 15 is provided. The sun gear is nonsupportedly, so to speak, suspended by the toothed coupling system 14 and is guided radially only through the tooth system. The sun gear is held axially in place by suitable means, for example by a snap ring 16. The driven shaft 9 is guided at least on the end adjacent the planetary gearing in a radially flexibly constructed bearing 17, 17'. As a result, the planetary gears or their planetary carriers 8 and indirectly also the sun gear 12 are guided through the toothed mating system on the internally toothed internal gear 2.

It is clear that in the case of a totally rigid ring or internal gear there exists no possibility of achieving an even load distribution on the three or more planetary gears 4. Deviations, caused by the manufacturing tolerances, from the ideal form of the gears such as true-running errors, flank-direction errors, etc. can also not be compensated for as for example a deformation of the internal gear 2 through outside influences. Part of this is for example a deformation of the housing as a consequence of a force acting from outside thereon or caused by temperature influences in the case of irregular housing contours in the area of the internal gear.

Figure 2:
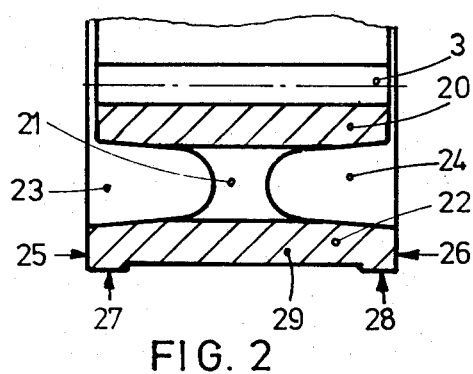
FIG. 2 illustrates the internally toothed ring or internal gear of the gearing arrangement according to FIG. 1 in a different scale.

For this reason, the internal gear 2, as again illustrated in FIG. 2, is provided with lateral recesses 23, 24, which divide the internal gear 2 into three sections: an inner ring 20 with the tooth system 3, which is connected to an outer ring 22 through an approximately disk-shaped web 21. The outer ring 22 has on both axial sides thereof bearing surfaces 25, 26 and short radially outwardly extending centering flanges 27, 28 receivable in appropriate contoured locations in the housing 1. The outside diameter of the outer ring is set back or reduced between the centering flanges, so that the internal gear has on a substantial part 29 of its width a smaller outside diameter than on its end sections. Through this type of construction, the internal gear 2 is elastic in itself: both the outer ring 22 and also the inner ring 20 is elastically deformable under a load but a deformation of one ring will not cause any substantial deformation of the other ring. The size of the possible deformations can be chosen in a specific manner by calculating according to the finite-element-method or by suitable tests. As very usable has proven to be a possible deformation of the internal gear which corresponds approximately with the radial elasticity of its tooth system 3. Thus deformations are absorbed partly by the body of the internal gear, partly by the tooth system. Of course, it may be preferable in special cases, to divide the specific deformation also differently.

Figure 3:
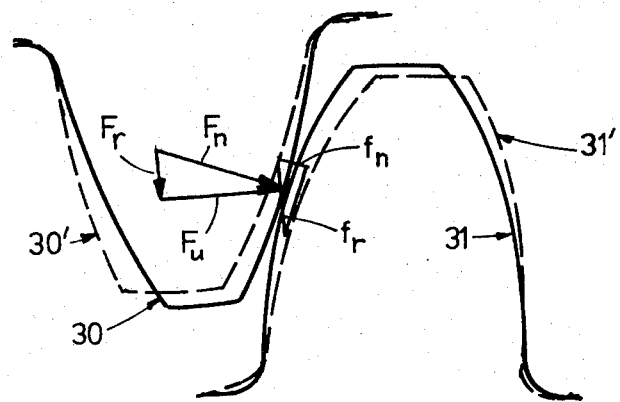
FIG. 3 schematically illustrates the flexibility of the tooth system in engagement.

For a better understanding of the radial elasticity of the tooth system, FIG. 3 illustrates in cross section a tooth 30 and a countertooth 31 not to scale. The normal force $F_n$ engages as a resultant from a peripheral force $F^u$ and a radial force $F_r$ on its contact line (perpendicular with respect to the picture plane). Under the influence of the peripheral force, an elastic deformation of the teeth occurs, namely the teeth are deflected a small amount (30', 31'). The size of the elastic deformation in the radial direction is indicated by $f_r$. The relationship $F_r/f_r$ is identified as a spring constant $C_r$ in direction of the radial force. Accordingly, the relationship of the normal force $F_n$ with respect to the bending $f_n$ is the spring constant $C_n$ in direction of the normal force. Between the two spring constants there exists the relation $$C_r = F_r/f_r \sim C_n \cdot \sin^2\alpha,$$

wherein $\alpha$ identifies the pressure angle of the tooth system. Since $C_n$ can be measured by simple devices, $f_r$ can be determined and can be made the basis of the forming of the internal gear. The mean value from the values which result during an engagement are preferably used thereby for determining the radial elasticity of the tooth.

This will be discussed in connection with an example from the practice. For the toothing of a toothed rim from a ship's gearing, the spring constant $C_n$ has been determined as 1,384,000 N/mm by loading a tooth in the direction $F_n$ and measuring the bending $f_n$. At an angle of engagement of $\alpha = 20°$, the spring constant $C_r$ is calculated as 162,000 N/mm. With this value, one can calculate for each radial load $F_r$ the corresponding radial deformation $f_r$. According to the above-indicated formula wherein $F_r = 10,000$ N, the radial deformation $f_r$ is 0.06 mm.

Figure 4:
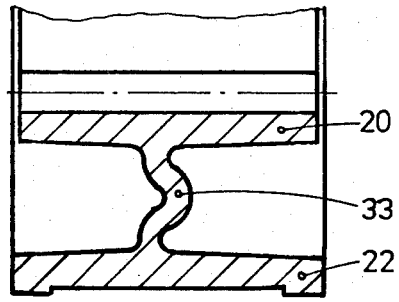
FIG. 4 illustrates a different embodiment of the ring or internally toothed internal gear.

Aside from the above-described deformability of the inner and outer rings (20, 22), it is also possible in some cases that the web 33 which is arranged therebetween is elastically deformable within certain limits (FIG. 4).

Figure 5:
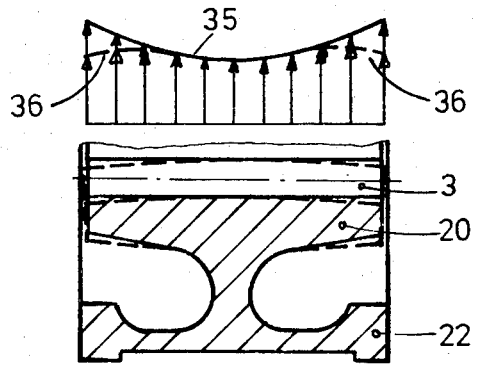
FIG. 5 illustrates an internal gear similar to the one of FIG. 1 with a schematic illustration of the load distribution thereon.

FIG. 5 illustrates a form of an internal gear 2, which form is similar to the embodiment according to FIG. 2 and moreover illustrates the load distribution 35 over the length of the tooth system 3. If the inner ring 20 would be completely rigid, then the load on the tooth system would be the greatest at their ends. Due to the elasticity of the ring 20 under load (dashed contour 37, strongly distorted), however, the load on the tooth ends is reduced (line 36). By a suitable calculation, it is possible to determine the probable deformation of the inner ring 20 so that an at least approximately even load distribution over the entire tooth width can be achieved. FIG. 5 also illustrates that it is preferable for an unhindered deformation to make the inner ring 20 with the tooth system 3 slightly more narrow on both sides than the outer ring 22.

Figure 6:
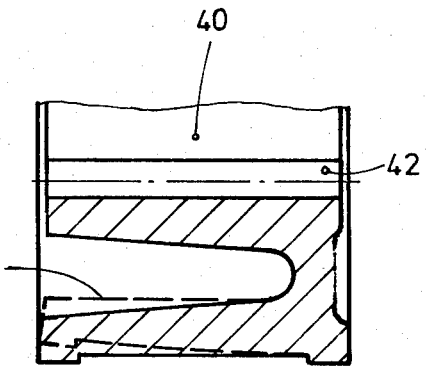
FIG. 6 illustrates an asymmetrical embodiment of the ring or internal gear.

The specific deformation of the internal gear is not limited to symmetrical constructions. FIG. 6 illustrates a nonsymmetrical internal gear 40. If we assume it is deformed by a force which acts from outside, such as it is illustrated strongly distorted in the dashed-line contour 41, then through a suitable design of the various areas of the internal gear said deformation can be held away at least substantially from the tooth system 42 and an at least approximately even load distribution over the entire tooth width can be assured.

The openings for receiving the fastening screws 18 are not illustrated in FIGS. 4, 5 and 6, since they have no direct relation to the invention as such and can be left unconsidered as a rule during the calculations. The invention is not limited to the example of use of a steerable propeller gearing but can be applied to all planetary gearing arrangements of the above-described type of construction.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a spur gear planetary gearing arrangement with a load balance having a sun gear supported on plural planetary gears and being in toothed engagement therewith, which planetary gears in turn are in toothed engagement with an internally toothed ring gear mounted in and connected to a gear box housing, said planetary gears being rotatably supported in a planetary carrier, the improvement comprising wherein said ring gear has an internally toothed inner portion and an outer portion radially outwardly spaced therefrom and means intermediate said inner and outer portions for facilitating a relative elastically deformable movement between said inner and outer portions and to a specific degree approximately equal with the radial elasticity of its tooth system and independent from the connection of said ring gear to said gear box housing, wherein said inner portion of said ring gear is an internally toothed inner ring and said outer portion is an outer ring, wherein said intermediate means includes an at least approximately disk-shaped web connecting said radially inner and outer rings, wherein at least one of said outer ring and said inner ring are designed and dimensioned such that each ring can be deformed elastically under a load without substantially deforming the other ring due to the presence of said web, and wherein said outer ring has a lesser thickness over a substantial part of its width than at its end sections.

2. The spur gear planetary gearing arrangement according to claim 1, wherein said internally toothed ring gear is constructed symmetrical about a central radial plane.

3. The spur gear planetary gearing arrangement according to claim 1, wherein said internally toothed ring gear is constructed asymmetrical about a central radial plane.

4. The spur gear planetary gearing arrangement according to claim 1, wherein said inner ring, said outer ring and said web are integrally formed of a single material.

* * * * *